Feb. 2, 1960　　　　　M. KOVAC　　　　　2,923,206
INDEXING ATTACHMENT FOR MILLING MACHINES AND THE LIKE
Filed May 11, 1955　　　　　　　　　　　　2 Sheets-Sheet 2
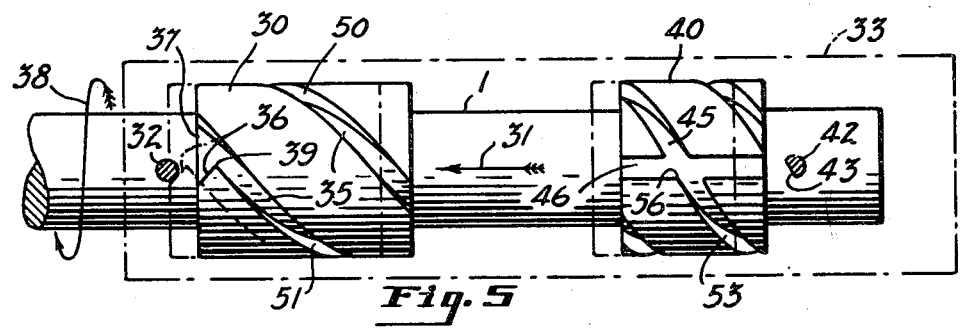
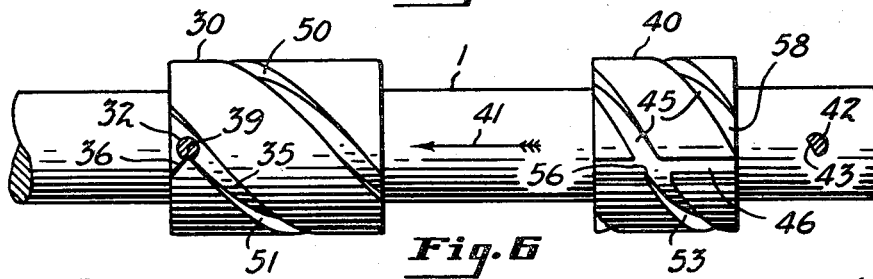
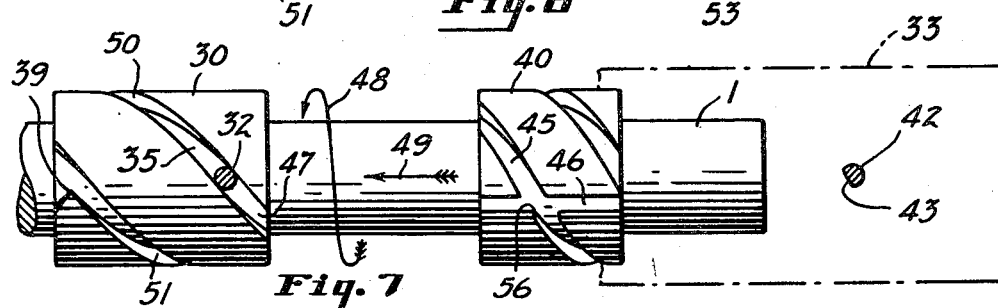
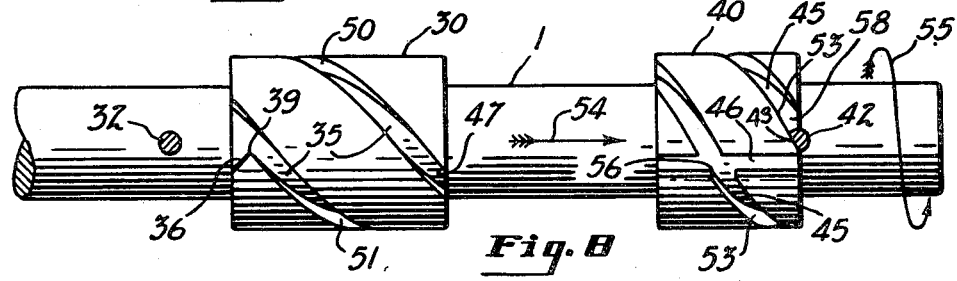
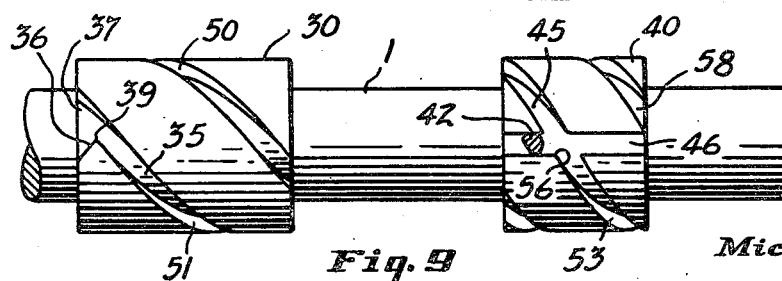
INVENTOR
*Michael Kovac*
BY *Schramm and Knowles*
ATTORNEYS

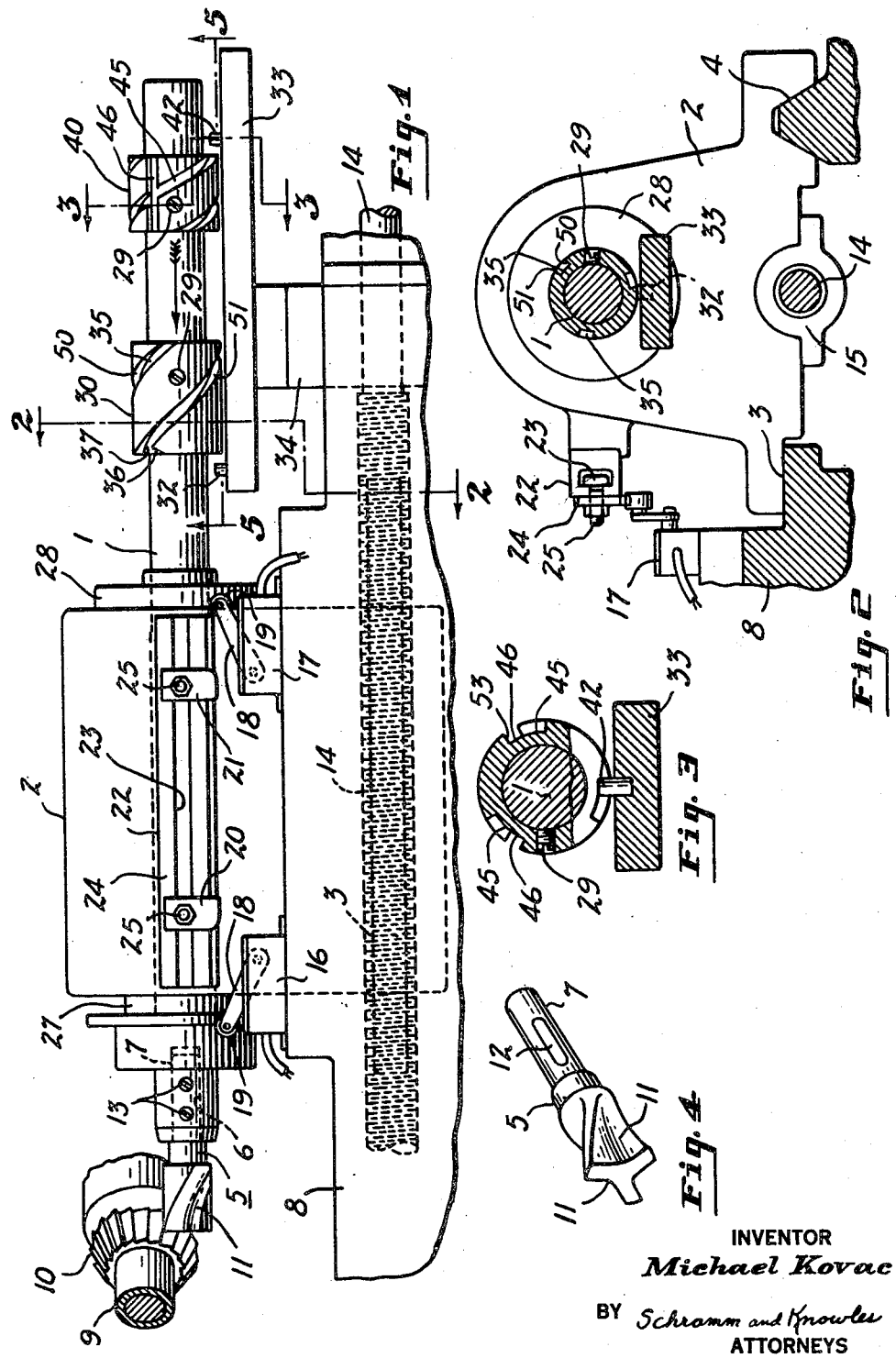

United States Patent Office 2,923,206
Patented Feb. 2, 1960

2,923,206

INDEXING ATTACHMENT FOR MILLING MACHINES AND THE LIKE

Michael Kovac, Lakewood, Ohio, assignor to Melin Tool Company, Inc., Cleveland, Ohio, a corporation of Ohio Application May 11, 1955, Serial No. 507,627

12 Claims. (Cl. 90—11.62)

This invention relates to automatic and semi-automatic machine tools, more particularly to indexing devices used in rotating a work piece into different rotative positions relative to a cutter or grinder.

In the cutting and grinding of spirally fluted tools such as end mills and drills it is customary to mount the tool blank or stock on or in the end of an axially movable arbor or spindle so that the tool blank can be rotated as it is advanced axially relative to the cutter or grinder. Rotation of the work-carrying arbor during the cutting or grinding operation is governed as by a pin stationary on the frame of the machine which rides in a guide groove in the periphery of a cylindrical drum fast on the arbor. Reaction between the pin and the groove wall effects the desired rotative movement of the arbor as axial movement of the latter advances the cylindrical drum and causes the pin to travel along the groove. When a number of spiral flutes are to be cut or ground in a tool blank the cylindrical guide drum is formed with a corresponding number of grooves and the fixed guide pin is introduced sequentially into the several grooves on successive work or cutting strokes of the arbor. Thus it becomes necessary after each cutting or grinding cycle to rotate the arbor for the purpose of turning the guide drum to a succeeding position in which the guide pin will move into a different guide groove on the next axial advancement of the arbor. The mechanisms for effecting the rotating or indexing of the work arbor to successive predetermined positions have not been entirely satisfactory because of inaccurate positioning of the arbor resulting in faulty tools. Indexing devices previously used have also been of rather complicated construction with attendant high cost and difficult maintenance.

It is, therefore, one of the principal objectives of the present invention to provide an inexpensive automatic indexing mechanism of simple design and construction for turning an axially reciprocable work arbor to different predetermined rotative positions. More specifically, the invention is concerned with an improved indexer of the pin and groove type for turning an arbor that is used to advance and retract a tool blank axially and relative to a cutter or grinder while rotating the blank about its axis for the purpose of forming a series of symmetrically arranged spiral flutes on the blank.

Another object is to provide an indexing attachment of the character mentioned that is of universal application and can be easily mounted on or applied to a conventional milling machine so that spiral flutes and grooves can be formed uniformly and accurately and substantially automatically. Other objects and advantages pertaining to certain novel features of construction and combinations and arrangements of parts are set forth in the following detailed description of a preferred embodiment of the invention representing the best known mode of practicing its principles. This description is made with reference to the accompanying drawings forming a part of the specification.

In the drawings:

Figure 1 is a fragmentary elevational view, partly diagrammatic, showing a milling machine frame and rotary cutter, the indexing device of the present invention being mounted on the machine frame in association with the rotary reciprocable work-supporting arbor;

Fig. 2 is a fragmentary sectional detail with parts omitted taken substantially along the line indicated at 2—2 of Fig. 1;

Fig. 3 is a sectional detail taken substantially along the line of 3—3 of Fig. 1;

Fig. 4 is a perspective of a completed tool representative of the type made by cutting and grinding operations governed by the indexing device of the present invention; and Figs. 5–9 are diagrammatic plan views of the rear end of the work arbor showing the relationships between the guiding and indexing cylinders and the fixed guide and index pins in various stages of operation.

The illustration of the present indexing attachment shows it mounted on a conventional milling machine, most of which has been omitted, the miller parts shown being only those considered helpful to an understanding of the construction and operation of the indexer. It is to be understood, of course, that the indexing device can be used with many kinds of machine tools having reciprocable arbors. It will also be apparent that the particular type of milling machine illustrated is not critical since the construction and arrangement of the indexer is readily adapted to various millers.

In the arrangement illustrated the horizontal tool-holding arbor is indicated at 1, being mounted for rotation about its longitudinal axis in a carriage 2 that reciprocates on flat and V ways 3 and 4. The carriage or slide 2 comprises a hollow housing portion in which are mounted bearing assemblies that support the arbor 1 for rotation and which also resist axial thrust on the arbor so that shifting of the carriage along the bed ways 3 and 4 advances and retracts the arbor endwise and bodily relative to the working cutter of the machine. The forward end of the arbor 1 is arranged to mount a work piece or blank 5 in coaxial relation. The arbor may have a chuck or collet or, as shown, may have an axial socket 6 that receives a complementally formed shank 7 on the work piece 5. A flat 12 is milled on the tool shank in a preliminary operation to be engaged by set screws 13 in the arbor 1 to locate the tool blank in predetermined position rotatively.

The milling machine has a conventional work arbor 9 on which is secured a cutter 10 here shown as a multitooth rotary bevel milling wheel. The cutter arbor 9 is journaled in the superstructure of the miller and held securely against axial shifting so that the advancement of the work piece 5 during the forward travel of the arbor 1 results in the cutting of a flute 11 the spiral shape of which is determined by the rotation imparted to the work piece. It is understood, of course, that the tool head mounting the cutter arbor 9 is rigid with the machine frame portion 8 so that the angle and position relationships between the axes of the cutter 10 and the work arbor 1 are maintained during the cutting operation.

Travel of the carriage 2 along the ways 3 and 4 is accomplished by a suitable drive mechanism the details of which have been largely omitted but which includes a reversible threaded shaft or lead screw 14, journaled at its ends in the frame 8 and held against axial shifting. This lead screw is located between and in parallel relation to the ways 3 and 4 and below and parallel to the axis of the work arbor 1. A nut 15 secured to the bottom of the carriage 2 engages the lead screw 14 so that rotation of the screw, say counterclockwise in Figure 2, advances carriage 2 to the left as shown in Figure 1 on a cutting or work stroke and rotation of the lead screw in the other direction, say clockwise as viewed in Figure 2, retracts the carriage to the right as viewed in Figure 1 on a return stroke.

The lead screw 14 is actuated by a suitable reversible electric motor through reduction gearing. Neither the motor nor the gearing is shown. A conventional electric control circuit governs the operation of the screw driving motor so that the motor can be started and stopped at the will of the operator and so that the motor reverses rotation when the carriage 2 reaches a predetermined limit of movement in each direction. The motor control may include, for example, switches 16 and 17 mounted on the machine frame 8 adjacent the travel path of the carriage. Each switch has an actuating arm 18 carrying a roller 19, the switches being so arranged in the motor control circuit that when the switch arm is actuated, the motor reverses rotation. This actuation of the switches is accomplished by contact elements or shoes 20 and 21 adjustably mounted on horizontal side rail 22 formed along one side of the carriage 2. In the arrangement illustrated, a T slot 23 is formed in the rail 22 and opens through flat vertical side face 24 of the rail. The shoes 20 and 21 are held in desired positions along the length of the rail as by nuts and bolts 25 the heads of which are received within the T slot 23.

In setting up the miller, the shoe 20 is positioned to engage the roller and depress the arm 18 of the switch 16 when the carriage reaches the desired limit of forward or working travel, to the left as viewed in Figure 1, so that the motor actuating the lead screw 14 is reversed in direction and turns the screw 14 to retract the carriage over the return stroke.

The shoe 21 is adjusted and fixed in place on the rail 22 so that at the desired limit of return travel of the carriage 2, or to the right as viewed in Figure 1, the shoe engages the roller 19 and actuates the arm 18 of the limit switch 17 so that the screw driving motor is reversed and the carriage is again driven in the forward or work advancing direction to move the arbor and the work piece carried thereby toward the cutter wheel 10 for the cutting of another flute in the work 5. It is contemplated, of course, that the control for the carriage actuating motor may include automatic speed change means arranged to move the carriage at a relatively slow rate of speed during the forward or work feeding movement (to the left) and to move the carriage at a relatively high rate of speed during the reverse or retraction movement of the carriage (to the right).

While the description of the invention is made with reference to a milling machine in which the carriage that mounts the arbor is driven electrically, it is apparent that the carriage may be actuated hydraulically or even manually. One of the characteristic features of the indexing attachment of the present invention is the independence of the indexer relative to the particular actuating and controlling means employed in the miller. The indexer is governed by the movement of the rotatable arbor relative to the bed or frame of the miller rather than by the establishment of an interconnection between the control for the carriage reciprocation and the work arbor rotation.

Since the indexing or turning of the work arbor is accomplished independently of the motor control for shifting the carriage longitudinally, it is feasible to change the arbor 1 and the turning and indexing guide cylinders from machine to machine. Thus in the several cutting and grinding operations that may be necessary to make, say, an end mill, the work piece or blank 5 can be carried by the same arbor 1. The utilization of the same arbor in several machines obtains a greater uniformity of product, avoids the accumulation of manufacturing errors in a single tool and obtains production economies that are not possible when the work arbors remain fixed in each of the several machines through which the work pieces are processed.

In the arrangement with the illustrated milling machine, the carriage 2 has removable circular end members 27 and 28 that permit bodily withdrawal and replacement of the arbor 1 without disturbing the setting of the machine. Thus, in a production run of, say, a batch of 100 of the work pieces 5, the arbor 1 is set up in the carriage 2 and the 100 work pieces are processed. The arbor 1 is then withdrawn from the carriage and moved to the next machine in which the batch of 100 work pieces are to be processed through the succeeding stage of production. The first machine is then set up with another work arbor and a second batch of work pieces is processed, appropriate changes being made in the positions of the switch controlling shoes 20 and 21 and the cutter 10 being changed on the arbor 9, if desired.

The rotating and indexing of the work-holding arbor are effected by cylindrical drums 30 and 40 carried by a rearwardly projected portion of the arbor which extends cantilever fashion from the supporting carriage 2 in which the arbor is journaled. During the forward or work stroke of the carriage, a pin 32 secured and upstanding in a horizontal plate 33 fastened to machine frame 8 by bracket 34 is received in one of a number of symmetrically arranged spiral grooves or channels 35 formed in the cylindrical surface of the guide drum. As the movement of the carriage advances the arbor 1 during a work stroke, the movement of the drum 30 relative to the fixed pin 32 causes the pin to travel along the length of the spiral groove 35 in which the pin is received. Reaction between the pin and the side wall of the groove effects the desired rotation of the arbor. On reverse movement or return travel of the carriage, the pin 32 retraces its path in one of the guide grooves 35 and ultimately moves out of and is freed from the constraint of the drum groove. Reverse movement of the carriage is continued beyond this neutral position, however, and carries the indexing drum 40 into coaction with an upstanding indexing pin 42, also secured in the fixed plate 33. The pin 42 is received during the reverse travel of the carriage and work arbor in any one of a number of symmetrically arranged spiral guide grooves 45 formed in the cylindrical surface of the indexing drum 40. Reaction of the index pin 42 against the side wall of one of the grooves 45 effects rotation of the arbor 1 to the next indexing position. The extent of this indexing rotation is determined by the entry of the guide pin 42 into any one of a number of axial grooves or channels 46 which are formed in the cylindrical surface of the index drum 40. The axial grooves 46 are equal in number to the spiral guide grooves 45, there being one axial groove intersecting each of the spiral guide grooves. The points of intersection are correspondingly located and symmetrically disposed about the drum circumference. After completion of the desired predetermined rotative or indexing movement of the arbor 1 by the movement of the indexing pin 42 in one of the spiral grooves 45, continued reverse movement of the carriage 2, until the limit of reverse movement is reached as determined by engagement of the shoe 21 against the roller and arm of the switch 17, merely results in relative travel of the pin 42 longitudinally in one of the axial grooves 46. On the next forward movement of the carriage 2 the index pin 42 does not retrace its path in one of the spiral guide grooves 45 but travels wholly in one of the axial grooves 46 until the index cylinder moves beyond the pin to the neutral or intermediate position illustrated in Figure 1. The carriage does not stop its forward travel in this neutral position, however, but continues movement to the left to bring the rotating guide cylinder 30 into coacting relation to the rotation pin 32, and the cycle is repeated.

The rotating or guide and indexing drums or cylinders 30 and 40 are in the form of sleeves which embrace the work arbor 1. The drums are secured on the arbor against rotation as by set screws 29.

While the pitch of the grooves 45 in the indexing drum 40 is shown to be different from, that is to say, less than that of the grooves 35 in the guide drum 30, it is apparent that the pitches of the grooves can be the same in the two drums. It is feasible to salvage guide drums or sleeves that have become worn in use by converting them to indexing drums by merely milling the axial guide slots 46 in the appropriate circumferentially spaced positions. The longer the pitch of the grooves 45 in the indexing drum, the longer the required travel to effect the indexing motion. Thus the relatively short pitch grooves 45 shown in the drawings obtain the desired indexing or rotative movement of the arbor on relatively short reverse axial travel of the arbor 1.

*Operation.*—The coaction between the drums 30, 40 and the pins 32, 42 may be understood from a consideration of diagrammatic Figs. 5–9 in connection with the preceding figures. The diagrammatic figures represent a bottom plan view of that portion of the arbor 1 which carries the guide and index drums 30, 40. This view is taken as though looking upwardly from a plane that is intersected by the pins 32, 42 so that the relationships between the pins on the one hand and the grooves of the drums or cylinder sleeves on the other hand, are apparent. The plane of the view is indicated by the line 5—5 of Fig. 1.

In Fig. 5 the parts are shown in full lines in neutral position and corresponding to the positions of the parts in Fig. 1. In movement of the arbor 1 in the direction of arrow 31, the parts travel without rotation to the broken line positions shown in which oblique wall face 36 formed in entry end 37 of the appropriate guide groove 35 is engaged against the guide pin 32. Each of the guide grooves 35 is formed with the entry wall surface 36 which is oppositely inclined to the walls of the spiral grooves 35. The reaction of the surface 36 against the pin 32 as the arbor continues to advance in the direction of the arrow 31 effects rotation of the arbor in the direction of arrow 38 to shift the parts to the relative positions of Fig. 6. Continued forward movement of the slide carrying the arbor 1 in the direction of arrow 41 of Fig. 6 results in relative movement of the pin 32 into the main portion of one of the grooves 35 clear of the inclined entry face 36. Engagement of the pin 32 against rear wall 50 of the groove 35 initiates and maintains rotation of the arbor 1 reversely to the preceding direction of rotation indicated by the arrow 38 in Fig. 5. The new or working rotation of the arbor is indicated by arrow 48, Fig. 7, and continues as the work 5 is moved into the milling cutter 10 in the formation of one of the spiral flutes or grooves 11. During this combined rotative and forward feed of the arbor 1 the arbor travels in the direction of arrow 49, Fig. 7, relative to the stationary pins 32 and 42.

At the completion of the forward or work stroke of the slide carriage 2 as determined, say, by the limit switch 16 and as represented by the relative positions of the parts in Fig. 7, the drive motor for the carriage slide is reversed and the carriage and arbor are moved relatively away from the milling cutter 10 by the reversing of the lead screw 14. The axial length of the guide drum 30 is such that the guide pin 32 remains within the axial limits of one of the grooves 35 throughout each cutting operation. The limit of movement represented in Fig. 7 shows the guide pin located at a distance from rear end 47 of the groove 35 in which it is guided. Thus when the reverse or return travel of the slide and arbor is initiated the arbor is rotated reversely to the direction of the arrow 48, the pin 32 retracing its path in the guide groove 35. The reverse rotation of the arbor during this return travel is effected by reaction or pressure of the pin 32 against forward wall 51 of the guide groove 35. Reverse rotation of the arbor ceases when the guide pin 32 clears the crest 39 at the intersection of the groove forward wall 51 and the inclined entry wall surface 36.

Continued reverse movement of the carriage 2 after the guide pin 32 is clear of the entry end 37 of the groove 35 results in further retraction of the arbor 1 (to the right as viewed in the figures) until the parts reach the relative positions shown in Fig. 8 which represents the start of the rotary indexing movement. In the stage of Fig. 8 a flat face 43 on the forward side of the index pin 42 engages forward wall 53 of one of the index grooves 45. Continued reverse movement of the arbor 1 in the direction of arrow 54 produces indexing rotation of the arbor in the direction of arrow 55. When the indexing pin 42 reaches that position in the indexing groove 53 at which the latter is intersected by one of the axial grooves 46 the pin moves around corner 56 into the axial groove to a position such as shown in Fig. 9.

The circumferential position of the corner crest 56 at the intersection of the spiral and axial grooves of the indexing drum or cylinder member relative to the entry 47 of the spiral groove determines the extent of the indexing or rotative movement. In the movement of the indexing pin 42 from the starting position of Fig. 8 to the set position of Fig. 9 the arbor 1 rotates through an angle which falls short of the nominal indexing angle by a small angular increment which represents or is determined by the thickness of the index pin 42. The amount by which the rotative movement derived from coaction between the index pin 42 and one of the spiral grooves in the indexing drum 40 falls short of the nominal indexing movement is made up by the slight rotative movement obtained by coaction between the guide pin 32 and one of the inclined surfaces 36 in one of the spiral groove entries 37 formed in the guide member 30. In the case of the three flute work piece shown, the nominal indexing rotation is 120°. A four flute job would require 90° indexing, a six flute job 60°, and so on.

In the illustrated arrangement, wherein the indexing grooves 45 are inclined in the same direction as the guide grooves 35, the indexing movement obtained through coaction between the indexing pin 42 and one of the cam grooves 45 falls short of the nominal 120° required for complete indexing. Completion of indexing movement to the desired rotative position is effected before the cutting starts by engagement and coaction between the guide pin and one of the entry guide surfaces.

By this arrangement, the indexing pin 42 is aligned with one of the axial grooves 46 during forward travel of the arbor after the main indexing movement as well as during the overtravel on the terminal portion of the reverse indexing movement. The incremental shifting accomplished by the reaction of one of the entry guide surfaces 36 against the guide pin 32 moves the indexing drum or member 40 so that the axial grooves are out of alignment with the indexing pin 42 and in lieu thereof the end of one of the spiral grooves 45 is aligned with the indexing pin.

The shoe 21 which actuates the limit switch 17 to determine the extent of reverse sliding movement of the carriage is adjusted to provide a slight overtravel of the parts such that the indexing pin 42 is in the forward portion of the axial groove 46 at the end of the reverse carriage travel. The actuation of the switch 17 by the shoe 21 reverses the drive motor and the lead screw 14 and initiates the forward travel of the slide carriage 2, which then advances from the extreme limit of movement to the right (represented by Fig. 9) to the extreme limit of movement to the left (represented by Fig. 7), passing through the intermediate or neutral position of Figs. 1 and 5. In normal operation the carriage does not stop in the neutral position, the forward and reverse movements of the carriage each being continuous and uninterrupted. Thus on the forward stroke the parts move from the extreme reverse travel limit of Fig. 9 to the work stroke travel limit of Fig. 7. A reverse travel stroke is from the relative positions of the parts shown in Fig. 7 to the positions shown in Fig. 9.

During each forward stroke of the arbor there is a period of rectilinear axial movement without rotation during which the index pin 42 moves longitudinally in the particular axial groove 46 in which it is engaged. After the index pin 42 clears the rear end of the axial groove 46 the arbor continues forward movement still without rotation until the inclined entry surface 36 engages the guide pin 32 to effect sufficient rotation of the arbor and the drum 30 for the pin to enter into one of the guide grooves 35. The setting of the parts (that is, the relative rotative positions of the cam slot drums 30 and 40 and the effective throw of each of the cam grooves 35 and 45) is such that initial engagement between the guide pin 32 and one of the inclined entry surfaces 36 produces a slight reverse rotation of the arbor in the direction represented by the arrow 38 (Fig. 5) which is opposite to the forward direction of rotation during working or the cutting of one of the flutes 11.

At the start and during the first part of the return stroke, engagement of the guide pin 32 in one of the spiral grooves 35 produces reverse rotation of the arbor to return the parts to the precise rotative position of Fig. 6 from which the rotary movement during the preceding cutting operation was initiated. In the position of the parts represented by Fig. 6 the continued reverse movement to the position represented by Fig. 8 is without rotation so that the indexing pin 42 is received in rear end opening or entry 58 of one of the spiral indexing grooves 45. The alignment of the parts is such that the flat face 43 of the indexing pin (identified in Fig. 5) engages the extreme end portion of the groove forward wall 53.

Further movement during the completion of the return travel of the slide and arbor to the position of Fig. 9 effects the desired rotation of the arbor to the next predetermined indexing position and the components are set for repetition of the cycle.

Although the cylindrical members 30 and 40 are shown with grooves in which fixed guide and indexing pins are received, it is apparent that equivalent results can be obtained in other ways, such as by a reverse arrangement using guide and indexing pins on the arbor traveling in spiral and axial grooves formed internally of cylindrical sleeves mounted in coaxial fixed relation to the arbor 1.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. A machine tool of the type employed to machine a plurality of circumferentially spaced surfaces on a work piece, said tool comprising a frame, a slide mounted on the frame for reciprocating movements over a rectilinear path, the slide path having cutting and indexing portions, a rotatable arbor carried by the slide, a grooved member carried by the arbor, the member having grooves paralleling the slide path and spiral grooves intersecting the path paralleling grooves, a pin fixed to the frame and receivable in one of the spiral grooves to interact with the grooved member to rotate the arbor less than a complete indexing step during travel of the slide along the indexing portion of the path, means to complete the rotation of the arbor through an indexing step and align another of the spiral grooves with the pin between successive indexing portions of the travel, and means to guide the arbor in work cutting positions during travel of the slide along the cutting portion of the path, whereby interaction of the pin and the grooved member rotates and indexes the arbor as the slide travels reciprocally along the slide path indexing portion to provide a device in which the arbor is rotated from one cutting position to another to cause spaced work surfaces to be successively machined one at a time.

2. A machine tool of the type employed to machine a plurality of circumferentially spaced surfaces on a work piece, said tool comprising, a frame, a slide mounted on the frame for reciprocating movements over a rectilinear path, the slide path having cutting and indexing portions, a rotatable arbor carried by the slide, first and second grooved members carried by the arbor, the first member having a plurality of grooves paralleling the slide path and spiral grooves intersecting the path paralleling grooves, the second grooved member having a plurality of spiral grooves, first and second pins fixed to the frame, the first pin being received in one of the spiral grooves of and arranged to interact with the first member to effect rotative movement of the arbor in an indexing step during travel of the slide along the indexing portion of the path, the second pin being received in one of the spiral grooves of and arranged to interact with the second grooved member to guide the arbor during travel of the slide along the cutting portion of the path, and means to complete the rotative movement of the arbor through an indexing step and align another of the spiral grooves of the first member with the first pin between successive indexing portions of the travel, whereby interaction of the first pin and the first grooved member rotates and indexes the arbor as the slide travels reciprocally along the slide path indexing portion to provide a device in which the arbor is rotated from one cutting position to another to cause spaced work surfaces to be successively machined one at a time.

3. A machine tool of the type employed to machine a plurality of circumferentially spaced surfaces on a work piece, said tool comprising, a frame, a slide mounted on the frame for reciprocating movements over a rectilinear path, the slide path having cutting and indexing portions, a rotatable arbor carried by the slide, first and second grooved members carried by the arbor, the first member having a plurality of grooves paralleling the slide path and spiral grooves intersecting the path-paralleling grooves, the second grooved member having a plurality of spiral grooves, and first and second pins fixed to the frame, the first pin being received in one of the spiral grooves of and arranged to interact with the first member to effect rotative movement of the arbor in an indexing step during travel of the slide along the indexing portion of the path, the second pin being received in one of the spiral grooves of and arranged to interact with the second grooved member to guide the arbor during the travel of the slide along the cutting portions of the path, one of the grooved members including guide surfaces inclined oppositely to the inclination of the spiral grooves of the one member, each of the guide surfaces being arranged to interact with one of the pins to effect rotative movement of the arbor during an indexing step and align another of the spiral grooves of the first member with the first pin between successive indexing portions of the travel, the rotative movement effected by the guide surfaces being in the same direction as that effected by the spiral grooves of the first member, whereby rotative movement effected by interaction of the first pin and the first groove member and effected by one of the guide surfaces indexes the arbor as the slide travels reciprocally along the slide path indexing portion to provide a device in which the arbor is rotated from one cutting position to another to cause spaced work surfaces to be successively machined one at a time.

4. A machine tool of the type employed to machine a plurality of circumferentially spaced surfaces on a work piece, said tool comprising, a frame, a slide mounted on the frame for reciprocating movements over a rectilinear path, the slide path having cutting and indexing portions, a rotatable arbor carried by the slide, first and second grooved members carried by the arbor, the first member having a plurality of grooves paralleling the slide path and spiral grooves intersecting the path-paralleling grooves, the second grooved member having a plurality of spiral grooves, and first and second pins fixed to the frame, the first pin being received in one of the spiral grooves of and arranged to interact with the first member to effect rotative movement of the arbor in an indexing step during travel of the slide along the indexing portion of the path, the second pin being received in one of the spiral grooves of and arranged to interact with the second grooved member to guide the arbor during travel of the slide along the cutting portion of the path, the second grooved member having a plurality of entries, each such enry being continuous with one of the spiral grooves, the second member also having a plurality of guide surfaces to interact with the second pin to effect completion of the rotative movement of an indexing step and align another of the spiral grooves of the first member with the first pin between successive indexing portions of the travel, each of such surfaces defining the extent of an entry, whereby rotative movement effected by interaction of the first pin and the first grooved member and effected by the second pin and one of the guide surfaces indexes the arbor as the slide travels reciprocally along the slide path indexing portion to provide a device in which the arbor is rotated from one cutting position to another to cause spaced work surfaces to be successively machined one at a time.

5. A machine tool indexing device comprising, a frame, a rectilinearly moveable slide carried by the frame, an arbor mounted on the slide for rectilinear movement therewith and for rotational movement relative to the slide, two pairs of interacting pin and grooved members, one of each pair of members being fixed to the arbor, the other of each pair of members being fixed to the frame in spaced relationship for interaction with the members fixed to the arbor, one of the grooved members having a plurality of axial grooves and a plurality of spiral grooves, the spiral grooves intersecting the axial grooves, the other of the grooved members having a plurality of spiral grooves, and means to shift the slide and arbor in rectilinear movement and to cause the pin and grooved members to interact to rotate the arbor.

6. A machine tool indexing device comprising, a frame, a rectilinearly moveable side carried by the frame, an arbor mounted on the slide for rectilinear movement therewith and for rotational movement relative to the slide, first and second pairs of interacting pin and grooved members, one of each pair of members being fixed to the arbor, the other of each pair of members being fixed to the frame in spaced relationship for interaction with the members fixed to the arbor, the grooved member of said first pair of members having a plurality of axial grooves and a plurality of spiral grooves, the spiral grooves intersecting the axial grooves, the grooved member of said second pair of members having a plurality of spiral grooves, one of the grooved members being formed with a plurality of guide surfaces disposed for engagement by the companion pin members, said guide surfaces being inclined to the axis of the arbor oppositely to the inclination of the spiral grooves of the grooved member of said first pair of members, coaction between said companion pin member and one of the guide surfaces effecting rotation of the arbor in the same direction as the rotation effected by coaction between the spiral grooves of the grooved member and the pin member of the first pair of members, and means to shift the slide and arbor in rectilinear movement and to cause the pin and grooved members to interact to rotate the arbor.

7. A machine tool indexing device comprising, a frame, a rectilinearly moveable slide carried by the frame, an arbor mounted on the slide for rectilinear movement therewith and for rotational movement relative to the slide, two pairs of interacting pin and grooved members, one of each pair of members being fixed to the arbor, the other of each pair of members being fixed to the frame in spaced relationship for interaction with the members fixed to the arbor, one of the grooved members having a plurality of axial grooves and a plurality of spiral grooves, the spiral grooves intersecting the axial grooves, the other of the grooved members having a plurality of spiral grooves, the spiral grooves of said other grooved member each having at one end an enlarged entry defined in part by a guide surface inclined to the axis of the arbor oppositely to the inclination of the spiral grooves, and means to shift the slide and arbor in rectilinear movement and to cause the pin and grooved members to interact to rotate the arbor.

8. In a machine tool having a frame, a work holding spindle, means mounting the spindle on the frame for rotation about its longitudinal axis and for endwise forward and backward travel between predetermined limits of movement, means acting during a working portion of each forward travel effecting predetermined rotative movement of the spindle, an indexing member fast on the spindle to travel and rotate therewith and formed with a plurality of circumferentially spaced axial grooves and a plurality of spiral grooves, each spiral groove intersecting one of the axial grooves at its rear end and another of the axial grooves between the ends of the latter, a pin fixed to the frame to ride in said grooves as the spindle and said member travel, the reaction of said pin against the wall of one of the spiral grooves during a portion of each backward travel effecting predetermined rotative indexing movement of the spindle as determined by the pin entering the axial groove intersected by such one spiral groove, whereupon the pin rides in such entered axial groove continuously until the backward travel is completed and during the initial portion of the next succeeding forward travel and retains the spindle indexed, and means operative between indexing movements to rotate the spindle relative to the pin to align the latter with another of the spiral grooves.

9. In a machine tool having a frame, a work holding spindle, means mounting the spindle on the frame for rotation about its longitudinal axis and for endwise forward and backward travel between predetermined limits of movement, means acting during a working portion of each forward travel effecting predetermined rotative movement of the spindle, an indexing member fast on the spindle to travel and rotate therewith and formed with a plurality of circumferentially spaced axial grooves and a plurality of spiral grooves, each spiral groove intersecting one of the axial grooves at its rear end and another of the axial grooves between the ends of the latter, a pin fixed to the frame to ride in said grooves as the spindle and said member travel, the reaction of said pin against the wall of one of the spiral grooves during a portion of each backward travel effecting predetermined rotative indexing movement of the spindle as determined by the pin entering the axial groove intersected by such one spiral groove, whereupon the pin rides in such entered axial groove continuously until the backward travel is completed and during the initial portion of the next succeeding forward travel and retains the spindle indexed, the rear ends of the grooves being open through the end of the indexing member so that upon completion of said initial portion of forward travel the pin is cleared by the indexing member to allow rotation of the spindle by said means acting during the working portion of the forward travel, and means operative between indexing movements to rotate the spindle relative to the pin to align the latter with another of the spiral grooves.

10. In a machine tool having a frame, a work holding spindle, means mounting the spindle on the frame for rotation about its longitudinal axis and for endwise forward and backward travel between predetermined limits of movement, means for effecting predetermined rotative working and indexing movements of the spindle during such travel, said last named means comprising first and second cam drum means fast on the spindle, the first drum means being formed with spiral grooves, the second drum means being formed with axial grooves and with spiral grooves intersecting the axial grooves, first and second pin means carried by the frame at points spaced axially along the spindle, the first pin means being receivable in one of the grooves of the first drum means during forward travel of the spindle and adapted to react against said first drum means and effect predetermined working rotation of the spindle, the second pin means being receivable in one of the spiral grooves of the second drum means during one portion of said backward travel of the spindle and in the axial groove intersected by said last mentioned spiral groove during another portion of said backward travel of the spindle and adapted to react against said second drum means to effect predetermined indexing rotation of the spindle during said one portion of backward travel and to retain the spindle in indexed position during said other portion of backward travel, said second pin means remaining in said last mentioned axial groove during the first portion of the next succeeding forward travel to hold the spindle in indexed position, and the pins being axially separated a distance greater than the overall axial length of the first and second drum means on the spindle so that during each forward travel the second pin means is cleared by the second drum means before the first pin means is received in one of the grooves of the first drum means.

11. In a machine tool of the type comprising a frame, a slide mounted on the frame for forward and backward reciprocating movement on a rectilinear path, an arbor rotatively mounted on the slide, a member fast on the arbor and formed with a plurality of grooves which parallel the slide path and a plurality of curved grooves which intersect the parallel grooves at points between the ends of the latter, a pin carried fixedly by the frame for engagement in the grooves, engagement of the pin in one of the curved grooves rotating the arbor as it is moved rearwardly, movement of the pin from such engagement in the one curved groove relatively into the path paralleling groove which intersects such one curved groove terminating rotative movement of the arbor at a predetermined point of the slide path during rearward movement, and engagement of such pin in the last mentioned path paralleling groove holding the arbor in fixed rotative position during continued rearward movement and allowing forward movement of the slide beyond such point without rotative movement of the arbor.

12. An indexing structure for a machine tool of the type comprising a frame and a spindle mounted on the frame for both rotative and rectilinear reciprocative movements, said structure comprising interfitting pin and groove members secured one to the frame, the other to the spindle, one of the members having spiral formations for receiving and guiding the other of the members, and said one member also having formations paralleling the path of reciprocation and, intermediate their ends, intersecting and being intersected by the spiral formations, said other member being adapted to coact with both the spiral and the path paralleling formations during each reciprocative movement, said interfitting members effecting rotative movement of the spindle during a portion of rearward travel to a predetermined point of said path, holding the spindle against rotative movement during another portion of such rearward travel, and permitting forward travel of the spindle without rotation to a position beyond said point.

References Cited in the file of this patent

UNITED STATES PATENTS

| | | |
|---|---|---|
| 2,002,967 | Spurr | May 28, 1935 |
| 2,203,798 | Romaine | June 11, 1940 |
| 2,362,288 | Melin | Nov. 7, 1944 |
| 2,677,169 | Cybulski | May 4, 1954 |

FOREIGN PATENTS

| | | |
|---|---|---|
| 1,046,014 | France | July 1, 1953 |